United States Patent [19]

Galel

[11] Patent Number: 5,442,565
[45] Date of Patent: Aug. 15, 1995

[54] AUTONOMOUS SELECTIVE CUTTING METHOD AND APPARATUS

[75] Inventor: Zev Galel, Palo Alto, Calif.

[73] Assignee: SeamX, Mountain View, Calif.

[21] Appl. No.: 55,626

[22] Filed: Apr. 30, 1993

Related U.S. Application Data

[63] Continuation-in-part of Ser. No. 43,138, Apr. 1, 1993, abandoned, which is a continuation of Ser. No. 874,988, May 1, 1992, abandoned.

[51] Int. Cl.⁶ .................... G05B 19/401; G06F 19/00
[52] U.S. Cl. ................... 364/474.02; 82/1.11;
                              82/118; 364/474.37; 364/551.02
[58] Field of Search ............... 364/474.37, 551.02,
       364/560, 474.02, 474.09; 82/118, 137, 1.11, 158;
                                                    318/640

[56] References Cited

U.S. PATENT DOCUMENTS

| | | | |
|---|---|---|---|
| 3,834,256 | 9/1974 | Abbatiello et al. | 82/118 |
| 4,018,113 | 4/1977 | Blazenin et al. | 82/118 |
| 4,038,890 | 8/1977 | Winget | 82/5 |
| 4,061,952 | 12/1977 | Dinsdale et al. | 318/572 |
| 4,203,062 | 5/1980 | Bathen | 318/571 |
| 4,250,779 | 2/1981 | Feller et al. | 82/118 |
| 4,365,301 | 12/1982 | Arnold et al. | 364/474.28 |
| 4,370,721 | 1/1983 | Berenberg et al. | 318/572 |
| 4,516,212 | 5/1985 | Nagashima | 364/474.37 X |
| 4,523,409 | 6/1985 | De Fazio | 51/165.71 |
| 4,546,573 | 10/1985 | Shiba et al. | 51/65.72 |
| 4,564,911 | 1/1986 | Smith et al. | 364/551.02 |
| 4,602,540 | 7/1986 | Murofushi et al. | 364/474.37 |
| 4,633,620 | 1/1987 | Lorenzi et al. | 51/165.72 |
| 4,645,917 | 2/1987 | Penney et al. | 364/556 |
| 4,759,243 | 7/1988 | Thompson | 82/118 |
| 4,777,769 | 10/1988 | McLaughlin et al. | 51/165.71 |
| 4,811,253 | 3/1989 | Johns | 364/474.37 X |
| 4,864,777 | 9/1989 | McLaughlin et al. | 51/165.71 |
| 4,879,664 | 11/1989 | Suyama et al. | 364/518 |
| 4,911,042 | 3/1990 | Shiozawa et al. | 82/1.11 |
| 4,914,869 | 4/1990 | Bayonnet et al. | 51/165.8 |
| 4,926,309 | 5/1990 | Wu et al. | 364/149 |
| 4,936,173 | 6/1990 | New | 82/18 |
| 4,974,165 | 11/1990 | Locke et al. | 364/474.35 |
| 4,986,149 | 1/1991 | Carmel et al. | 82/1.11 |
| 4,995,087 | 2/1991 | Rathi et al. | 382/8 |
| 4,999,555 | 3/1991 | Yamazaki et al. | 318/578 |
| 5,010,491 | 4/1991 | Biasillo et al. | 364/474.28 |
| 5,024,527 | 6/1991 | Harrison | 82/1.11 |
| 5,027,680 | 7/1991 | Kohari et al. | 82/1.11 |
| 5,034,877 | 7/1991 | Shultz | 364/167.01 |
| 5,054,340 | 10/1991 | Sugita et al. | 82/118 |
| 5,060,544 | 10/1991 | Hanaki et al. | 82/1.11 |
| 5,072,399 | 12/1991 | Laws et al. | 364/474.29 |
| 5,270,942 | 12/1993 | Reed | 364/474.37 |
| 5,291,393 | 3/1994 | Matsumoto et al. | 364/474.37 X |

OTHER PUBLICATIONS

Bangs, S., *Welding Design & Fabrication*, pp. 45–48 (Nov. 1984).
J. Schefter, *Popular Science*, pp. 94-95 (1985).
*Aviation Week & Space Technology*, p. 51 *Jul. 15, 1991).

*Primary Examiner*—Joseph Ruggiero
*Attorney, Agent, or Firm*—Townsend and Townsend Khourie and Crew

[57] ABSTRACT

Real time in-process data is collected to determine the contour and position of the interface between dissimilar layers of material. A control system is automatically programmed, based on the determined contour and position of the interface, to autonomously control the trajectory of a cutter through a conventional motion control system to separate the dissimilar layers of material. The motion control system controls the cutter movement through, for example, a conventional linear motion device including a servomotor, lead screw, and slidable carriage that holds the cutter.

18 Claims, 7 Drawing Sheets

| $\alpha^0$ | 0.05 | 0.10 | 0.15 | 0.20 | 0.25 | 0.30 | 0.35 | 0.40 | 0.45 | 0.50 | 0.55 |
|---|---|---|---|---|---|---|---|---|---|---|---|
| 1 | | | | | | | | | 1.000 | 1.000 | 1.100 |
| 2 | | | 1.000 | 1.001 | 1.000 | | | | 1.000 | 1.200 | 1.200 |
| 3 | | | 1.001 | (1.000) | 1.000 | | | | 1.000 | 1.000 | 1.200 |
| 4 | | | 1.000 | 0.998 | 1.002 | | | | | | |
| 5 | | | | | | | | | | | |

AUTONOMOUS SELECTIVE CUTTING METHOD AND APPARATUS

This is a continuation-in-part of application Ser. No. 08/043,138, filed Apr. 1, 1993 abandoned, which is a continuation of application Ser. No. 07/874,988, filed May 1, 1992, now abandoned.

BACKGROUND OF THE INVENTION

The invention relates to cutting generally, and more specifically to autonomously controlling the position of a cutting tool to selectively remove one layer of material from a dissimilar layer of material.

Selective cutting generally involves removing an undesired layer of material from a desired layer. In conventional machine tools, including machine tools of the numerical control (NC) and computer numerical control (CNC) type, a cutting tool typically is mounted on a carriage which is moved by a motor driving the carriage through a lead screw. Typically, control signals are supplied to the motor by a motion control system to control the cutting path of the cutting tool. In this way, the tool can automatically machine a rotating workpiece, for example, to a predetermined profile. However, since the cutting path of the predetermined profile must be pre-programmed into the system, it must be known in advance of the cutting. This is a problem in selective cutting applications where the location of the interface between dissimilar layers of material to be separated is not known. Accordingly, selective cutting generally has been limited to manual operations. However, in manual operations operator error can result in over extension of the cutter and damage to the desired layer.

SUMMARY OF THE INVENTION

The present invention is directed to a selective cutting method and system that avoids the problems and disadvantages of the prior art. This goal is accomplished by providing a system that autonomously scans a particular workpiece to be cut and collects real-time in-process data relating to features of that workpiece. The system processes that data and generates a program to autonomously control the trajectory of a cutter to selectively remove an undesirable layer of material from the workpiece, for example.

According to a preferred embodiment, a structure having first and second dissimilar layers of material is provided with one layer disposed on the other. The structure is scanned and the position of points on the first and second layers of material is detected by a laser optics system, for example, and fed into a processor. Based on the detected position of the points, the processor autonomously generates data indicative of the position and contour of the surface of the first layer adjacent the second according to an algorithm. That is, the processor processes the digitized samples and generates, corrected samples that represent the position of the aforementioned first layer surface. Based on the processed data, the processor then autonomously controls the position of a cutter to follow the surface of the first layer adjacent the second layer and remove the second layer from the first layer. Accordingly, the present invention provides autonomous selective cutting of dissimilar layers of material, when the interface between those layers is unknown before cutting.

The use of real-time data also permits the system to accurately remove a layer of material from another layer having substantial variances in thickness or being out-of-round, for example. In addition, the autonomous acquisition of real-time data allows the system to readily adapt to different applications where the layer characteristics and configuration significantly differ from workpiece to workpiece.

Another advantage of the real-time acquisition of data specific to a given workpiece is that it allows the system to accommodate applications where poor set-up or fit-up of the workpiece is involved (e.g., where a cylindrical member is not concentrically positioned on a lathe) or where the workpiece is noncylindrical. This provides significant reduction in set-up costs since the system can accommodate poor set-up. Specifically, a method for cutting a rotating workpiece at a constant depth according to the present invention comprises the steps of providing a workpiece on a workpiece holder, scanning the outer peripheral surface of the workpiece (i.e., the surface to be cut such as the outer cylindrical surface of a cylindrical workpiece) and detecting points representing that surface, rotating the workpiece holder and, thus, the workpiece, and autonomously controlling the position of a cutter based upon the points detected in the scanning step such that the cutter follows a path parallel to the contour of the peripheral surface and at a constant depth in the workpiece. Thus, the cutter is maintained at a constant depth even though the workpiece may be mounted on the workpiece holder such that the peripheral surface of the workpiece is not concentric with the rotational axis of the workpiece holder.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

Figure 1:
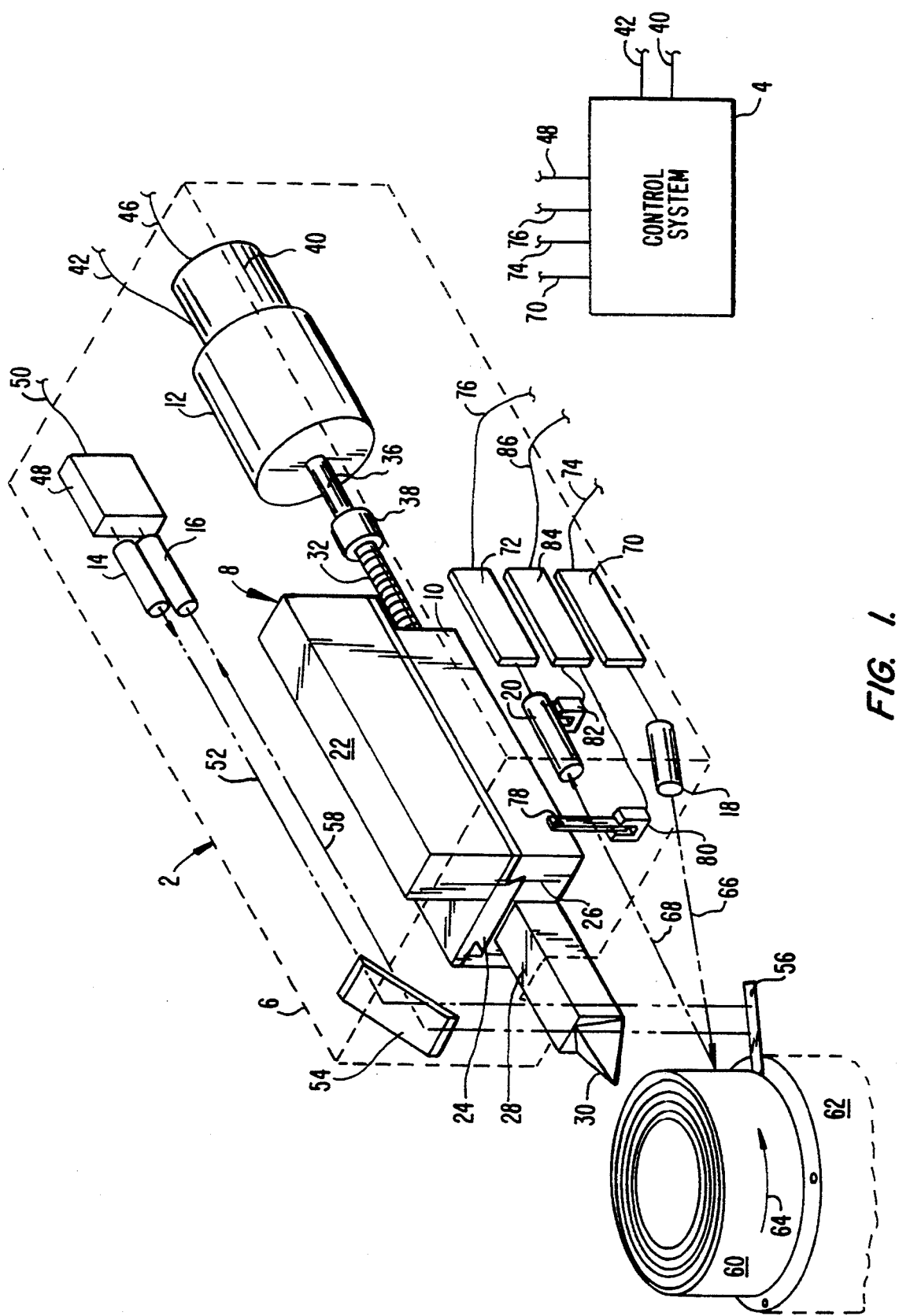
FIG. 1 is a schematic illustration of a cutting system in accordance with the principles of the present invention.

Referring to the drawings in detail, wherein like numerals indicate like elements, a selective autonomous cutting method and system in accordance with the principles of the present invention will be described. Referring to FIG. 1, a cutting head 2 and control system 4 for autonomously separating dissimilar layers of material is shown according to the present invention. Cutting head 2 includes a cutting tool, a servomotor for reciprocating the cutting tool, and optical sensors. Control system 4 includes a central processing unit (CPU) and a conventional display, power distribution system and operator interface (e.g., a remote go-stop control unit). The optical sensors are coupled to the CPU which, in turn, is coupled to the servomotor system for autonomously controlling the trajectory of the cutting tool based on data gathered from the sensors, as will be described in more detail below.

Cutting head 2 includes a casing 6 (shown in phantom) which houses the cutting tool mount 8, cutting tool carriage 10, drive 12, light or laser emitters 14, 18 and photosensors 16, 20. Cutting tool mount 8 is fixedly secured to the casing and includes a flange 22 which is preferably dimensioned to fit into a conventional adjustable tool post of a conventional machine tool lathe. In this way, the cutting head is retrofitable onto a conventional lathe. Carriage 10 is slidably coupled to cutting tool mount 8 so that the carriage can be reciprocated back and forth. Preferably, the bottom portion of cutting tool mount 8 and the upper portion of the carriage are configured to provide a dove-tail slide mechanism therebetween. In the embodiment illustrated in FIG. 1, cutting tool mount 8 includes fan-shaped tenon 24 which fits into corresponding mortise 26 formed in the carriage. Cutting tool holder 28 extends from one end of carriage 10 and includes cutting tip or cutter 30 which preferably is detachably mounted to the cutting tool holder as is conventional in the art. Cutting tip 30 also preferably includes a conventional insert such as a carbide insert. The insert composition generally selected according to the workpiece material as would be apparent to one of skill in the art. One suitable cutting tip insert is commercially available from Kennemetal, Inc. of Latrobe, Pa., under model no. TNMG332-KC730.

Figure 2:
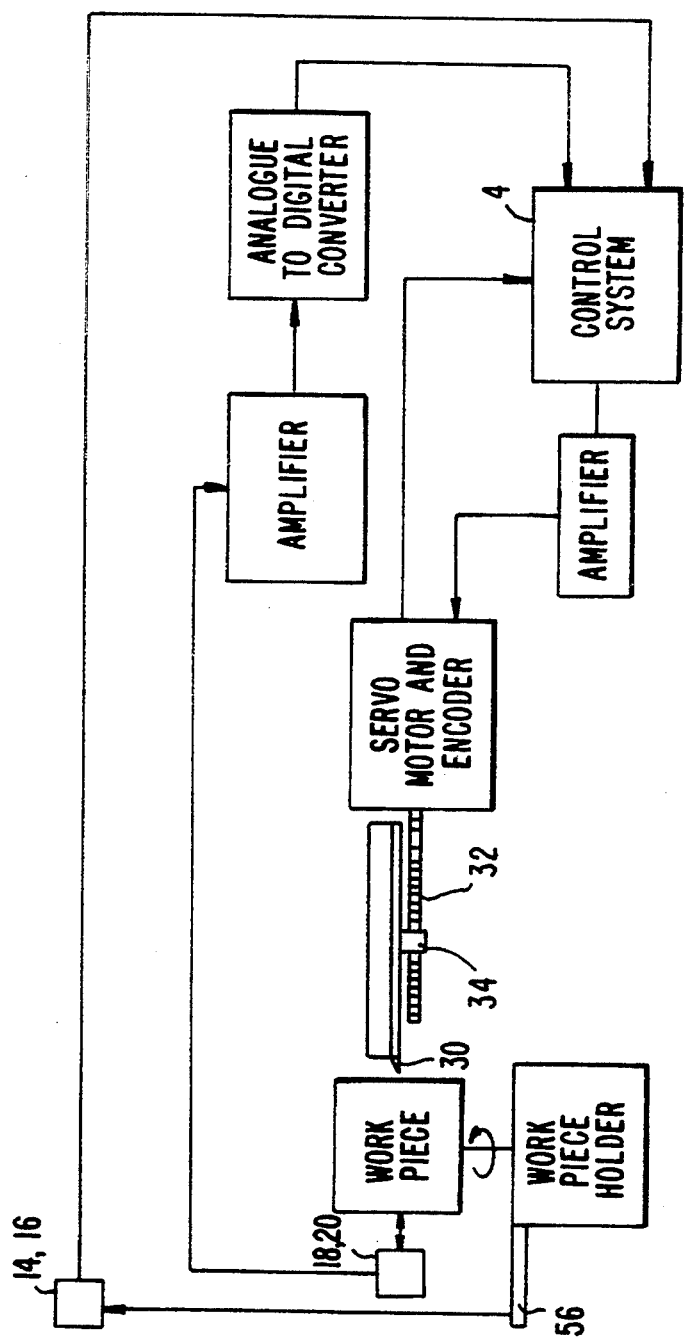
FIG. 2 is a block diagram of the cutting system of FIG. 1.

Carriage 10 and, thus, cutting tip 30, are reciprocated by drive 12, which preferably is a servomotor, and lead screw 32 as is conventional in the art. Lead screw 32 is rotatably coupled to planetary nut 34 (FIG. 2) which, in turn, is fixedly secured to carriage 10. One suitable planetary nut it commercially available from ITW Spiroid of Chicago, Ill. under model "Spiracon" roller screw and nut. In this way, rotation of lead screw 32 linearly displaces carriage 10 either forward or backward, depending on the direction of rotation of the screw. Lead screw 32 is coupled to the output shaft 36 of servomotor 12 through a conventional zero-backlash coupling 38. Servomotor 12, which is fixedly secured within casing 6, is provided with a conventional encoder 40 for counting the revolutions of the shaft. In this way, the position of cutting tip 30 can be monitored at all times. Motor control line 42 for actuating and deactuating the motor, and encoder signal line 46, are connected to the CPU. Each line comprises a plurality of leads as is conventional in the art. The central processing unit processes the signals from the encoder to determine the position of the cutting tip and control rotation of the servomotor through control line 42.

As described above, cutting head 2 includes light or laser emitters 14, 18, and photosensors 16, 20. Emitter and photosensor pair 14 and 16 are used to determine the RPM and detect each revolution of the workpiece being cut, while emitter and photosensor pair 18 and 20 are used to scan the workpiece and detect (or sense) the distance between the points on the surfaces of the first and second layers of the workpiece and photosensitizer 20 or some other datum point. Emitter 14 and photosensor 16 are of conventional design and are coupled to preamplifier 48 which includes a driver for emitter 14. Signals indicative of an "on" condition are transmitted to the CPU from photosensor 16 and preamplifier 48 through line 50 which also couples the driver of preamplifier 48 to the control system. As illustrated in FIG. 1, emitter 14 emits a light or laser beam, designated by reference number 52, which is reflected by mirror or prism 54 arranged at an angle of about 45 degrees relative to the path of beam 52, for example, such that beam 52 is directed toward reflective strip 56 when strip 56 is in the position shown in FIG. 1. The reflected beam 58 is then directed to the photosensor 16 by mirror or prism 54. Photosensor 16 then sends a signal through preamplifier 48 and lead 50 to the CPU indicative of an "on" condition. Light-reflective strip 56, having a surface made of micro-glass beads, for example, is attached to either workpiece 60 or workpiece holder 62 of a lathe, for example. As the workpiece rotates in the direction of arrow 64 the reflective strip 56 also rotates such that receiving photosensor 16 detects each revolution of the workpiece when the reflective strip comes into alignment with emitted beam 52. Any suitable emitter and photosensor can be used such as those commercially available from Banner Engineering of Minneapolis, Minn., under model number SM312LV and BRT-T-100, respectively.

The second optical sensing system includes light or laser emitter 18 and triangulation photosensor 20, both of conventional design. For example, emitters and photosensors commercially available from Keyence of Japan under model number LC 2100 are suitable. Emitter 18 emits a beam 66 preferably having a minimum spot diameter of about 0.2 millimeter. Beam 66 is reflected off the workpiece 60 as designated by reference numeral 68 and received by photosensor 20. Photosensor 20 includes a conventional photosensitive strip of material having a resistance that varies as a function of the location of the reflected beam along the longitudinal axis of the strip. The photosensitive strip is oriented in the same plane as the incident and reflected laser beams 66, 68. In addition, the angle of the incident laser beam and the orientation of the photosensitive strip preferably are arranged such that the reflected beam strikes the photosensitive strip at a point in the middle region of the strip. Laser beam emitter 18 is coupled to conventional laser beam driver 70 (which is coupled to the control system through line 74), while photosensor 20 is coupled to amplifier 72 (which is coupled to the CPU through line 76). The control system determines the position and path of consecutively detected points on the workpiece by noting the path of the laser beam along the axis of the elongated strip as the workpiece is rotated. For example, if the detected points follow a cylindrical path, the reflected laser beam will stay approximately in the middle region of the photosensitive strip. However, if the detected points follow an elliptical path, the laser beam will reciprocate up and down the axis of the photosensitive strip as the major axis and then the minor axis of the elliptical path traverses laser beam 66.

Cutting head 2 also is provided with a system for limiting the linear translation of carriage 10 and, thus, cutting tip 30. This limiting system includes guillotine 78 which is fixedly secured to carriage 10, forward limit sensor 80, and rearward limit sensor 82. Sensors 80 and 82 are coupled to a driver 84 to generate a light beam between the legs of the U-shaped sensors 80 and 82. Driver 84 also includes electronics for detecting the interruption of the laser beam between the legs of either of the U-shaped sensors 80 and 82 by guillotine 78 when carriage 10 travels to the extent that the guillotine is positioned within one of those sensors. Driver and interruption detector 84 is coupled to the CPU as designated by line 76. The control system processes signals received from detector 84 and deactivates the motor when the carriage is moved to these limits. This ensures that the carriage will not fly out of cutting tool mount 8 and, in addition, detects a problem in the motion control program which will be described in more detail below. Although a conventional guillotine-type limit sensing system is illustrated in FIG. 1, other limit sensing systems can be used without departing from the scope of the present invention.

In operation, the CPU receives and analyzes the real-time data transmitted by sensors 16 and 20 in order to determine and execute the desired trajectory of cutting tip 30 through a conventional motion control system that is incorporated into control system 4. In the first step of analyzing the information from optical sensors 16 and 20, the workpiece is rotated and the CPU digitizes the data from the sensors and then filters and discards nonsignificant data and noise according to an algorithm as will be described in more detail below with reference to the example illustrated in FIGS. 3-9. After the CPU carries out the algorithm and determines the position and contour of the surface of the first material from which the second material is to be removed, it goes on to plan the trajectory of the cutting tip for the final cutting of the workpiece to remove the undesired second layer and any faults (such as bumps on the first layer). That is, the information gathered by the photosensors is translated by the CPU into a program which is used to control the trajectory of the cutting tip through the motion control system during the final cut.

In the case where a constant depth of cut into the peripheral surface of the workpiece (which may be generally smooth, for example) is desired, photosensor 20 detects the points on that surface as the workpiece is rotated and the CPU processes that information (i.e., the distance between those points and a datum point) to map the profile or contour of that surface. As the workpiece is rotated, the control system controls the position of the cutter to follow a path parallel to the contour of that surface at a constant depth in the workpiece.

Merely to illustrate how the algorithm is developed in accordance with the present invention, the following example case is provided in which an undesired layer of honeycomb is removed from the smooth underlying metallic surface. However, it should be understood that the following example is in no way intended to limit the scope of the present invention.

Figure 3:
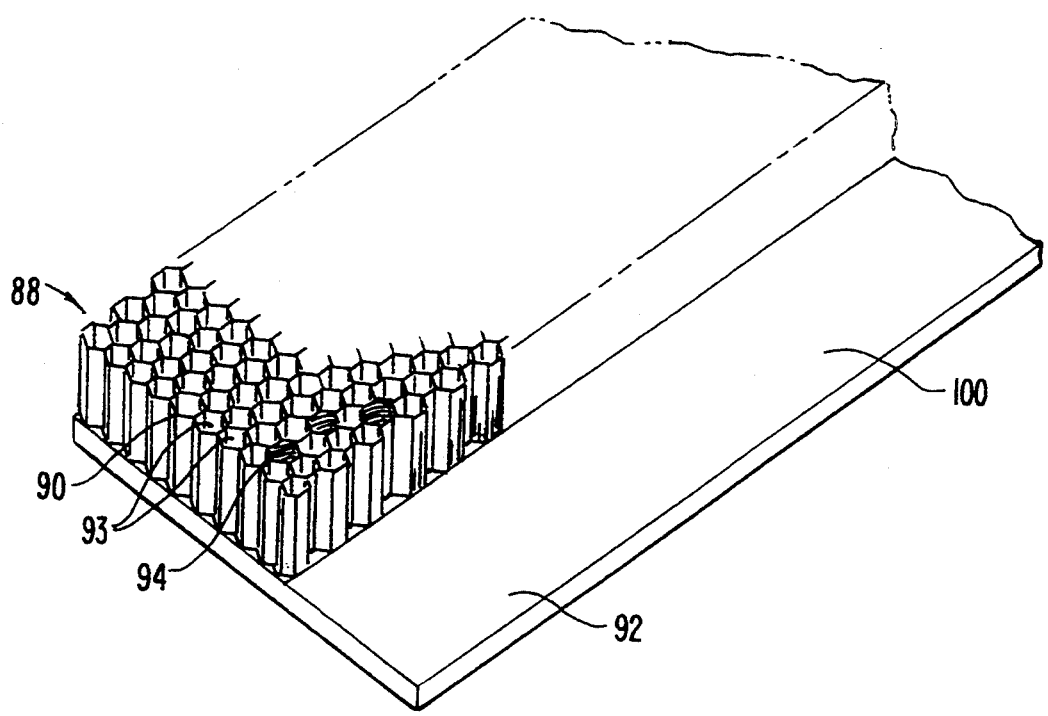
FIG. 3 is a perspective of a portion of a jet engine part having dissimilar layers of material.
Figure 4:
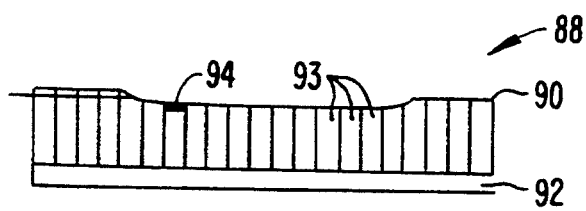
FIG. 4 is an end view of the part of FIG. 3.
Figure 5:
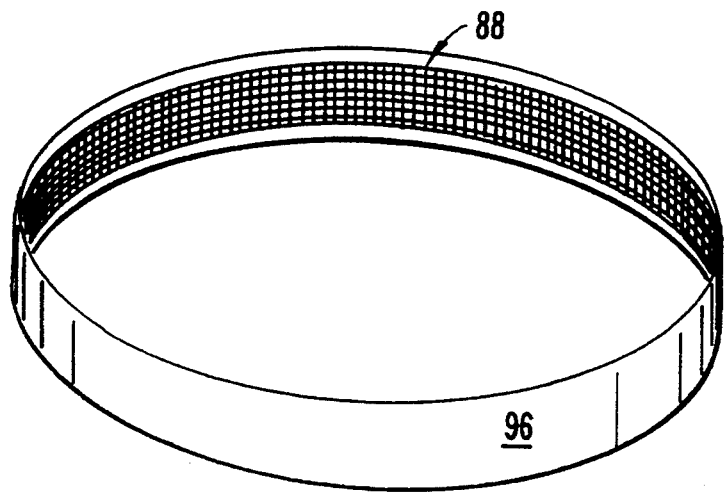
FIG. 5 is a perspective of the part of FIG. 3 mounted in a ring for rotation and cutting thereof.
Figure 6:
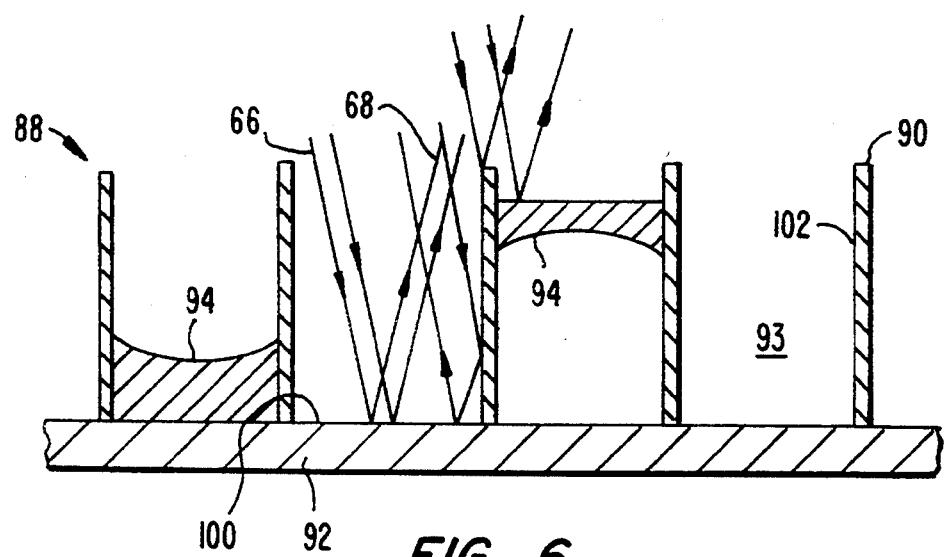
FIG. 6 is an enlarged view of the part as illustrated in FIG. 4 schematically illustrating laser detection of points on both layers of material in accordance with the present invention.
Figure 7:
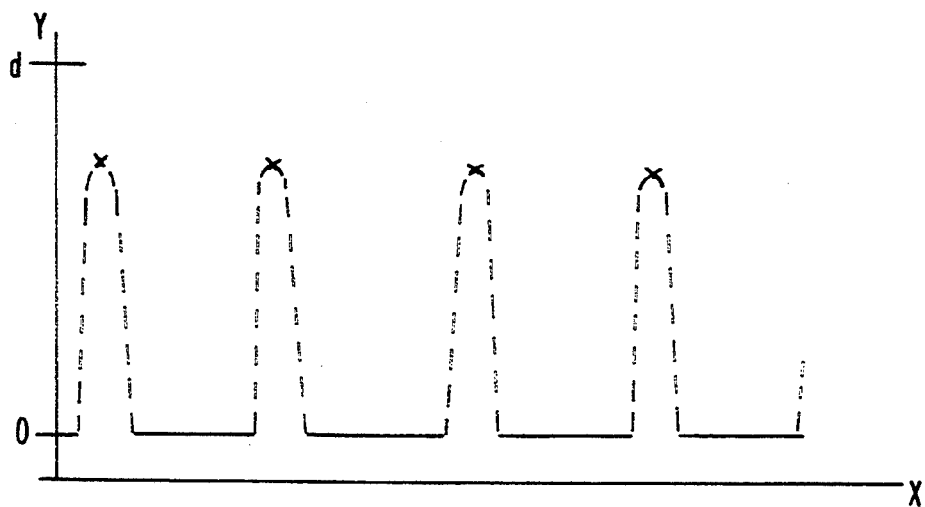
FIG. 7 shows data gathered from the laser detection process illustrated in FIG. 6 in ideal conditions.
Figure 8:
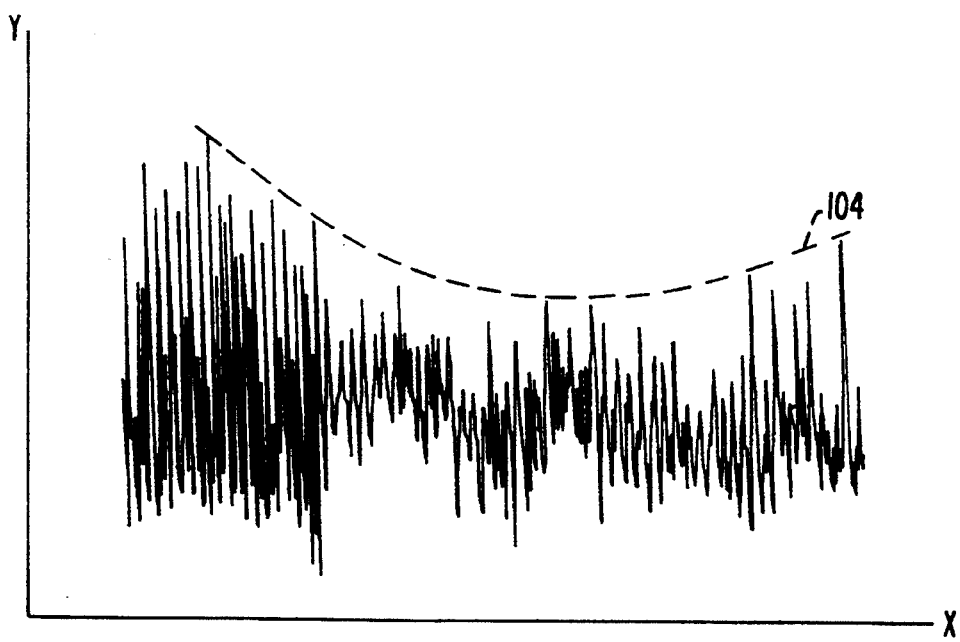
FIG. 8 is a graph showing actual data gathered (including noise) with the laser detection system of the present invention.

Referring to FIGS. 3 and 4, a jet engine part 88 having a layer of honeycomb 90 superimposed upon a smooth underlying metallic surface, i.e., base metal 92, is shown. For purposes of illustration, a portion of the honeycomb is shown removed as by the selective cutting system of the present invention (FIG. 3). Honeycomb 90 comprises a plurality of cells 93 some of which may be partially or wholly plugged, for example, as indicated by reference numeral 94. Although jet part 88 can be in the form of a ring segment or a full ring, for example, it is shown as having a ring-shaped configuration in FIG. 5. Part 88 is further shown secured to the inside of ring fixture 96 so that it can be mounted to the workpiece holder of a conventional lathe for rotation therewith. As would be apparent to one of ordinary skill, the laser emitters, photosensors and cutter would be arranged so that the laser beams and cutter would approach part 88 from the inside of the ring. Referring to FIG. 6, as part 88 is rotated, incident laser beams 66 will reflect off of the upper surface 100 of base metal 92 (i.e., the interface between the undesirable layer 90 of honeycomb and the base metal layer 92), cell walls 102 of the honeycomb, and other features of the composite structure such as material 94 that may obstruct a particular cell. FIG. 7 illustrates the data obtained from the reflection patterns shown in FIG. 6 in ideal conditions where the X-axis represents time and the Y-axis represents the distance between the point of incidence in the workpiece and a datum or reference point "d" which preferably is at photosensor 20 The O-coordinate corresponds to the position of upper surface 100 of base metal 92. However, actual conditions, noise and inconsistencies in the honeycomb, such as obstructions 94 in the cells, cause the signals received by photosensor 20 and sent to the CPU to generate a much more complex pattern as illustrated in FIG. 8. It then becomes more difficult to determine the exact position of the base metal. The present invention incorporates an algorithm described below so that the CPU can process the information, such as that illustrated in FIG. 8, to determine the exact position and contour of the base metal. The position of the upper surface of base metal 92 (determined according to the present invention) is shown by line 104 in FIG. 8 to illustrate the relationship between significant and insignificant data.

The autonomous separation of dissimilar materials (e.g., honeycomb 90 and base metal 92) generally is carried out in two steps: a precut (or rough cut), during which the part to be cut is simultaneously scanned by photosensor 20 and the real-time data digitized and sent to the CPU, and a final cut, during which the control system controls the trajectory of the cutter 30 to precisely follow the surface of the base metal based on the information gathered during the precut and processed by the CPU.

That is, the CPU processes this data during a first rough cut to determine the position of the base material and autonomously generates a program, which it runs during a final cut, to control the motion of the cutting tip and remove the layer of honeycomb from base metal 92 as will be described in more detail below.

In the first step or precut, the cutter preferably is positioned such that it penetrates into the honeycomb by at least about 50% the thickness of the honeycomb and preferably near 100% the thickness of the honeycomb with a minimal amount of honeycomb remaining between the cutter and base metal 92. This degree of penetration will vary according to how out-of-round the workpiece is, for example. Although it is not necessary that the cutter be positioned to cut any material in this scanning step in accordance with the present invention, when the rough cut is performed while scanning, a subsequent rough cut step is avoided which is clearly advantageous. Once the cutter is positioned for the rough cut, according to the preferred method for this example, the motor and encoder are deactuated so that the cutter remains stationary relative to the cutting head throughout the scanning and data gathering step. Thus, the cutter does not reciprocate and appears to behave like a standard cutter to the machinist. Then, laser emitters 14, 16, photosensors 16 and 20 are actuated, the work piece holder is rotated such that ring fixture 96 is rotated therewith, and cutter head 2 (through its tool post described above) is moved along a straight path so that cutter 30 moves substantially parallel to the rotational axis of ring fixture 96 (i.e., gradually across the width of parts 88) at a substantially constant feed rate. An adjustable feed mechanism associated with the tool post, as is conventional in the machining art, can be used. Thus, as ring fixture 96 rotates and cutter 30 is fed along the inner surface of fixture 96, cutter 30 cuts a spiral path. In addition, emitter 18 directs a laser beam at the inner surface of fixture 96 so that the point of incidence of the loser beam leads the cutter so that photosensor 20 detects the characteristics of the part along the spiral path that the cutter will follow. Thus, a number of frames data, each corresponding to one revolution of fixture 96, is collected by the CPU.

Ring fixture 96 is provided with a reflective strip, such as strip 56, which is orientated such that photosensor 16 senses the beginning and end of each revolution of the fixture as described above. Thus, the reflective strip can be attached to the edge of fixture 96 so as to extend therefrom in a direction generally perpendicular to the rotational axis of the fixture. Preamplifier 48 sends signals to the CPU, each representing a revolution of fixture 96, The CPU processes this information with the information detected by photosensor 20 and generates a matrix. Thus, the distance between each sensed point on part 88 and photosensor 20 (i.e., sampling) is put into the matrix according to the angular position of a sensed point within a frame (i.e., a 360° revolution). In the example case where the radius of part 88 is about 15 inches, the distance between sensed points in a frame in the matrix is in the range of about 0.1°-0.001° depending on the workpiece RPM. It has been found that at about 30 RPM this distance preferably is about 0.05°. A sensed point, thus, can represent the base metal 92, the wall of a honeycomb cell 93, the upper edge of a honeycomb cell, or an obstruction 94 or some other imperfection. Thus, the CPU must verify whether or not each distance represented in the matrix is a valid representation of the distance between the base metal 92 and photosensor 20. The algorithm used to make this determination will be described with reference to the example CPU generated matrix illustrated in FIG. 9.

Figures 9, 10, 11:
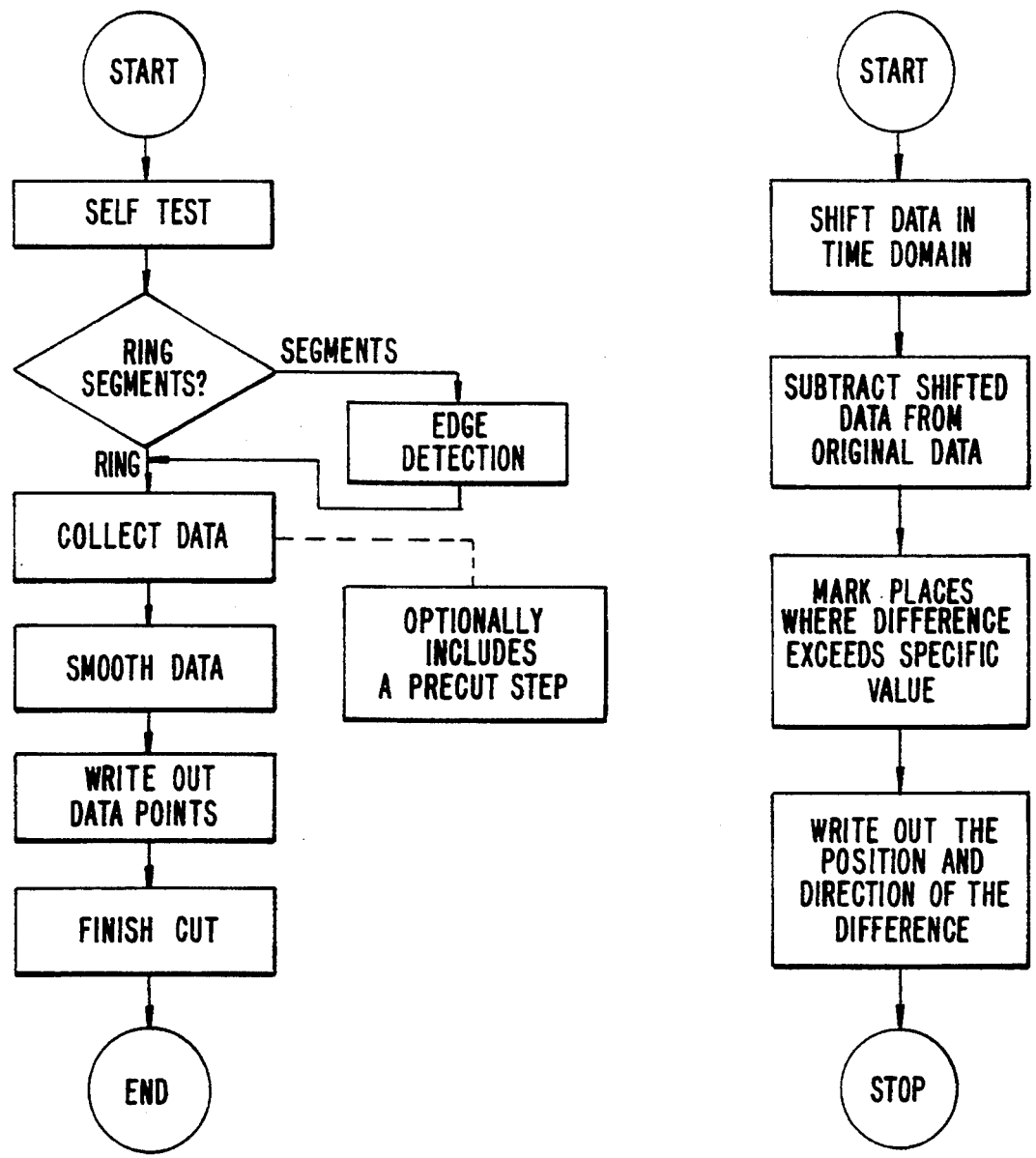
FIG. 9 is a matrix illustrating the basic algorithm of the present invention.
FIGS. 10–13 and 14A, B and C are simplified flow charts of operation of the invention.
Figure 12:
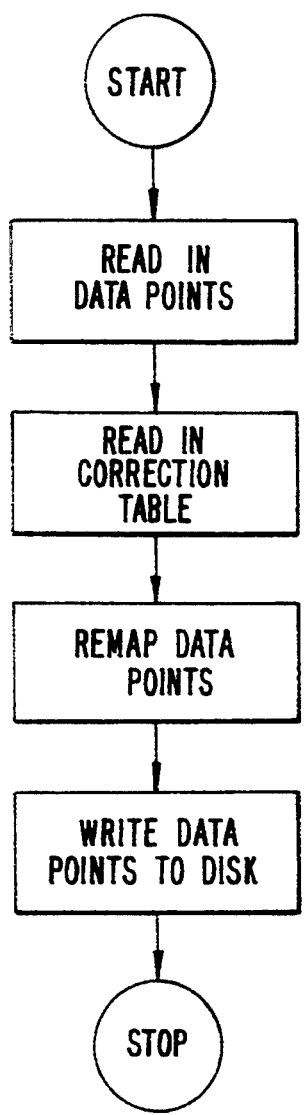

Referring to FIG. 9, the angular orientation ($\alpha$) of each sensed point is indicated along the top row and the frame number is indicated along the left column. For purposes of simplification, only 11 consecutive points and 5 frames are shown. In addition, the actual values of the samplings (as opposed to binary code) are shown for illustrative purposes. The numerals in the matrix representing $\alpha$ correspond to positions at 0.05, 0.10, 0.15, 0.20, 0.25, etc. from the beginning of a particular frame. During verification, each piece of information in the matrix indicating distance is compared with each adjacent piece of information. If the difference between the piece of information being verified and a compared piece of information does not exceed a predetermined value, the piece of information being verified is kept in memory as the distance between the base metal and photosensor 20 at its particular location on a respective part 88. Through experimentation it has been found that the difference discussed above should not exceed about 0.004 inch, and preferably should not exceed about 0.002 inch, for honeycomb having a cell height of about 0.25 inch, and a cell density of about 500–1000 cells/in$^2$. For example, referring to the circled 1.000 inch distance shown in FIG. 9 at 0.20° ($\alpha$no. 4) from the beginning of frame 3, none of the adjacent data (1.000, 1.001, 1.000, 1.001, 1.000, 1.000, 1.998, 1.002) differs from the 1.0 inch distance being verified by more than 0.004 inches. Thus, the circled value is kept in memory as a valid distance. However, this is not the case for the 1.200 inch distance shown at 0.50° ($\alpha$no. 10) from the beginning of frame 2. Adjacent to this data is 1.000, 1.000, 1.100, 1.000, 1.200, 1.000, 1.000 and 1.200. Since the data being verified (1.200) differs from at least one adjacent piece of information for sampling by more than 0.004 inch it is dumped from memory and replaced with the value corresponding to the last verified data in frame 2 (i.e., 1.000), unless a sufficient number of subsequent values in frame 2 verifies the 1.200 value. In the latter case, the 1.200 value is kept in memory as a valid distance between base metal 92 and photosensor 20. That is, the subsequent data can verify that the distance between base metal 92 and photosensor 20 actually increased more than 0.004 inch. It has been found that the required number of consecutive verifying values for the example case is about 10–100, and preferably about 40 values, to provide the desired cutting accuracy. Thus, if the difference between adjacent verifying values for the subsequent 40 consecutive values, for example, does not exceed 0.004 inch, the sample being verified is considered good and kept in memory. However, if a difference between any adjacent values exceeds 0.004 inch throughout the entire verifying group the value undergoing verification is dumped and replaced with the preceding value. In this way, the contour of the base material of the workpiece is determined exclusively by the information generated by photosensor 20. The information generated by photosensor 16 is used to flag the beginning of each revolution of the workpiece so that the CPU can compare two or more adjacent contours (as shown in adjacent frames in FIG. 9) of the workpiece.

Based on the verified data representing the position of the base metal relative to photosensor 20 and the distance between photosensor 20 and cutter 30 when at a zero reference position, the CPU generates a program for the motion control system that is provided within control system 4. The motion control system is of conventional design. The program runs the motion control system during the final cut to control the trajectory of cutter 30 and remove the honeycomb material without removing base metal 92.

Referring to FIGS. 10–13 and 14A–C, simplified flow charts illustrating a method of carrying out the invention are shown. FIG. 10 illustrates the overall autonomous selective cutting process, while FIGS. 11, 12, 13 and 14 illustrate the edge detection, correction, precut, and finish cut subroutines. Referring to FIG. 1, the operator actuates a start button which initiates a standard self test which includes testing the CPU, and the servomotor, for example. The limit sensors 80 and 82 are tested. Then the operator determines whether the workpiece is a continuous ring or a segmented ring. If it is a segmented ring, then the edge detection subroutine is used to differentiate data obtained between adjacent segment edges from other data and eliminating the data gathered between those edges. However, if the workpiece is in the form of a continuous ring, the emitters and photosensors are actuated for data collection which optionally includes a precut step. The collected data, representative of points on the workpiece, is smoothed and the smooth data written out so that the data points indicative of the desired trajectory of the cutter can be used during the finish cut to position the cutter to remove the undesired material.

Referring to FIG. 11, the edge detection includes the steps of shifting the data in a time domain, subtracting the shifting data from the original data, marking the places where the difference exceeds a specific value and writing out the position and direction of the difference. The correction step shown in FIG. 12 includes reading in the data points or samplings, reading in the correction table which includes the verification steps described with reference to the algorithm discussed above, remapping the data points to provide a program to control the intended trajectory or the cutter, and writing the remapped data points to a disk.

Figure 13:
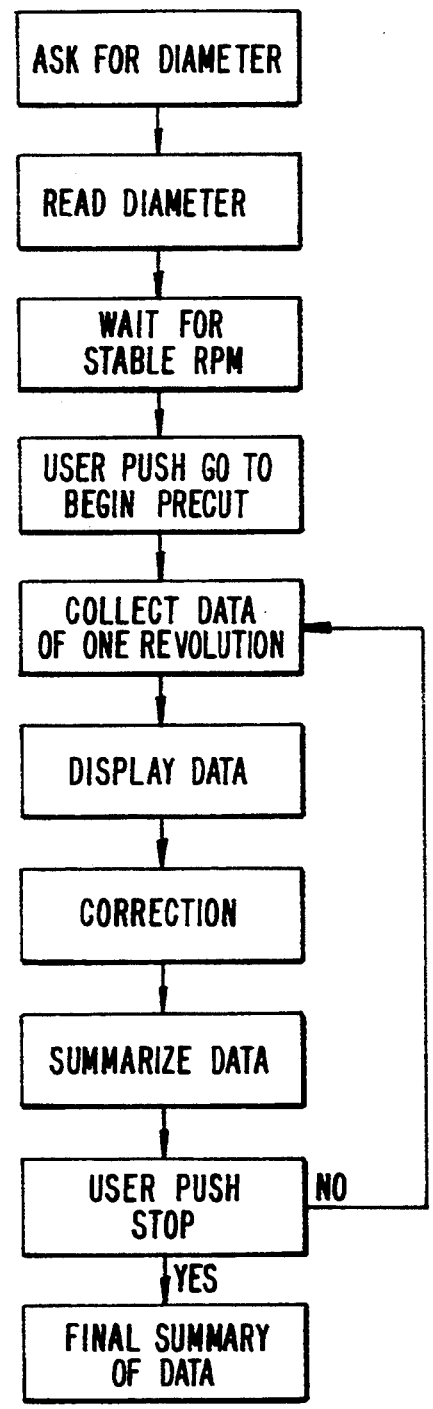
Figure 14A:
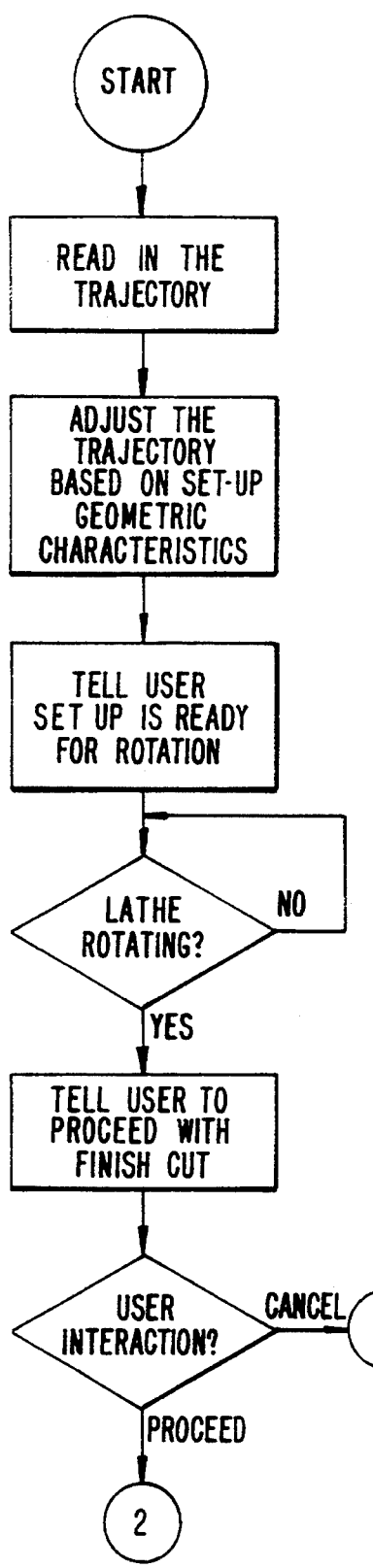
Figure 14B:
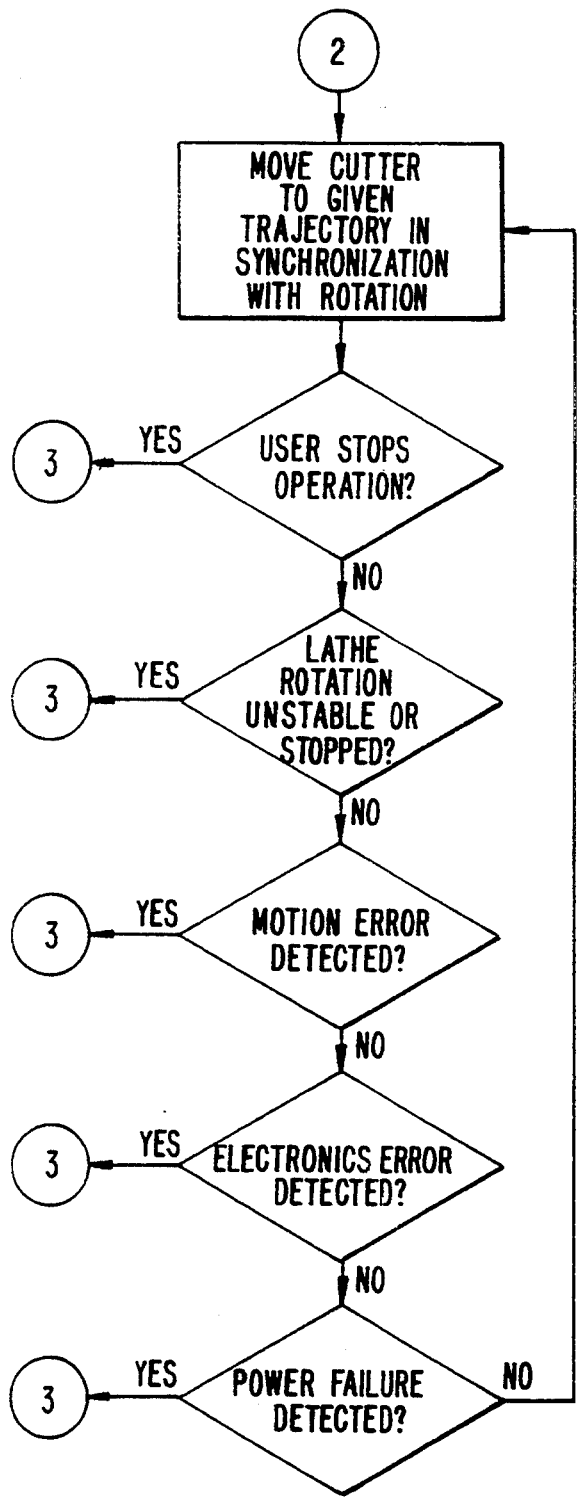
Figure 14C:
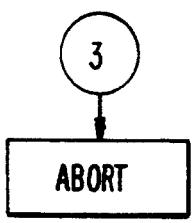

The combined collecting, smoothing and precut process is shown in FIG. 13, where the operator is first asked for the diameter of the workpiece since this will determine the depth to which the cutter is initially positioned into the layer of material being removed. The diameter is read into the CPU and then the operator waits for a stable RPM of the workpiece. Once the workpiece RPM has stabilized, the operator pushes go to begin the precut. During the precut data is collected for one revolution and that data displayed, corrected, and summarized. If the operator does not push the stop button, the workpiece continues to rotate and data is collected for another revolution and that data displayed, corrected and summarized. When all of the data necessary to be collected is collected, the operator pushes the stop button and a final summary of the corrected data is made. Then, the workpiece is ready for a finished cut. As shown in FIGS. 14A-C, the operator pushes the start button for finish cut, and the desired trajectory of the cutter is read into the CPU. The trajectory of the cutter is then adjusted according to the set-up and geometric characteristics of the workpiece including its diameter. This is to compensate parallax between the cutter and laser sensor 20 centerlines. The system then tells the user that the set-up is ready for rotation. Once it is confirmed that the lathe is rotating, the system tells the user to proceed with the finish cut. At that point the user decides whether to proceed with the finish cut or whether to cancel that operation. If the user determines to proceed with the finish cut, the cutter is moved to the given trajectory in synchronization with rotation at which time the CPU takes over control of the cutter to control its position in accordance with the collected and smoothed data. The process is aborted if the user decides to stop the operation, the lathe rotation becomes unstable or it stops, motion error is detected, and electronics error is detected or a power failure is detected.

Although the invention has been described with respect to a part having a layer of honeycomb and a smooth base metal layer, the invention can be applied to numerous other applications where it is desirable to remove one material from another, or merely to remove material from its environment. In addition, the sensed characteristic of the workpiece surface can differ from that described. For example, it can be color, color gradients, density, conductivity, roughness, or any combination of these or other physical properties. Then the algorithm verifying the validity of collected data is modified accordingly. For example, if the surface of the undesired layer is relatively rougher than the surface of the underlying desired layer, the width of the reflective beam will be wider (more scattered) when reflecting off the undesired layer versus the desired layer. The pattern recognition subroutines or algorithm of the CPU will be modified to interpret the scattering to mean that the beam is focused on the undesired layer. Further, the workpiece or structure to be cut is not limited to those having a circular configuration as shown in FIG. 1 as would be apparent to one of ordinary skill.

As is apparent from the foregoing, the present invention has many diverse applications. For example, it is contemplated that the cutting head be incorporated into a catheter for removing plaque from the wall of the artery. In this case, the sensed property preferably would be density and the sensing medium preferably ultrasound. The cutter also can be provided with three-dimensional movement so that it can selectively remove cancer cells from healthy cells in a patient. It is also contemplated to use selective cutting system of the present invention in the shipping industry where it can be used to remove barnacles from ship hulls, for example. This is especially advantageous to avoid reduction in hull speed and visibility to enemy sonar due to turbulent flow created by the barnacles. In a similar way, the invention can be used to remove paint from an underlying surface. It is also contemplated that the present invention has application in agriculture to sense ripe fruit on a tree and direct a cutter mounted on a large flexible hose to that particular fruit to cut the fruit so that it falls through the hose into a receptacle.

The system and method of the present invention also can be used in semi-conductor fabrication. In that case, it would be used to remove a certain amount of dielectric insulator deposited over an active layer to ensure that the insulation layer is truly flat before positioning another active layer upon the insulator when fabricating a chip. Generally, when building a chip, the active layer is provided. A passive layer is deposited on that active layer by plasma deposition, for example. The dielectric layer ends up having a three-dimensional terrain due to the configuration of the transistors in the active layer. Since the dielectric layer comprises glassy material, the system is programmed to detect the deepest depression that does not penetrate below the highest point on the active layer. The deepest point of that depression is then used to set the position of the cutting apparatus to remove all insulator material above that location, resulting in a flat surface of the insulator material.

The above is a detailed description of a particular embodiment of the invention. It is recognized that departures from the disclosed embodiment may be made within the scope of the invention and that obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A method for separating dissimilar layers of material comprising:
   providing a cutter and a structure having first and second dissimilar layers of material;

scanning the structure and detecting points representing the surface of the first layer adjacent the second layer;

rotating the structure and reflecting a beam off an element which is associated with the structure and rotates therewith to detect each revolution of the structure; and controlling the position of the cutter based upon the points detected in the scanning step such that the cutter follows a path along the first layer and removes the second layer from the first layer.

2. The method of claim 1 wherein the controlling step includes reciprocating the cutter with a mechanism that is driven by a servomotor.

3. A method for separating dissimilar layers of material comprising:

providing a cutter and a Structure having first and second dissimilar layers of material;

providing the structure with a reflective surface, rotating the structure, and emitting a light beam in the path of the reflective surface such that the beam is reflected off the reflective surface during a complete revolution of the structure;

scanning the structure and detecting points representing the surface of the first layer adjacent the second layer; and controlling the position of the cutter based upon the points detected in the scanning step such that the cutter follows a path along the first layer and removes the second layer from the first layer.

4. A method of separating dissimilar layers of material joined at an interface, said second layer forming an outer surface opposite said interface, said method comprising the steps of:

(a) autonomously scanning said, outer surface, sensing features of said structure along said outer surface, and Collecting data points indicative of the sensed features;

(b) autonomously comparing one collected data point corresponding to one sensed feature on the workpiece with other collected data points corresponding to sensed features adjacent the one sensed feature and retaining the one collected data point if it conforms by a predetermined degree to each of the other collected data points; and (c) autonomously controlling the position of a cutter, based on data generated and retained in steps (a) and (b), to follow said interface and remove the second layer from the first layer.

5. The method of claim 4 wherein the sensing of step (a) is conducted with a photosensor.

6. The method of claim 11 wherein step (b) comprises discarding said one collected data point and replacing it with an adjacent data point if it does not conform by said predetermined degree to each of said other collected data points, unless it conforms by a predetermined degree with a number of data points collected subsequent in time and in close proximity therewith.

7. A method Of separating dissimilar layers of material joined at an interface, said second layer forming an outer surface opposite said interface, said method comprising the steps of:

(a) autonomously scanning said outer surface;

(b) detecting the distance between each point on the structure and a reference point;

(c) converting each detected distance into a digital representation;

(d) storing the digital representations in a data memory;

(e) selecting digital representations which correspond to the distance between said interface and said reference point by comparing the distance values represented by digital representations related to scanned points on the structure that are relatively close in proximity to one another; and (f) autonomously controlling the position of a cutter, based on the selected digital representations of step (a), to follow said interface and remove the second layer from the first layer.

8. The method of claim 7 wherein step (e) includes comparing one digital representation with a group of digital representations each related to a scanned point on the structure that is adjacent to the scanned point that is related to the one digital representation, and retaining the one digital representation if the difference between the distance value represented thereby and the distance value represented by each one of the digital representations in said group does not exceed a predetermined value.

9. The method of claim 8 wherein the comparing step includes dumping from the data memory the one digital representation and replacing it with one of the digital representations in said group if said difference exceeds the predetermined value, unless the distance value represented by the one digital representation substantially corresponds to the distance values represented by a predetermined number of digital representations that relate to points scanned later in time and in close proximity to the point related to the one digital representation.

10. The method of claim 9 wherein the comparing step, in which one digital representation is compared to other digital representations, is repeated such that each digital representation is similarly compared to other digital representations.

11. A method for cutting a rotating workpiece at a constant depth comprising the steps of:

(a) securing said workpiece to a rotatable workpiece holder;

(b) scanning the outer peripheral surface of the workpiece and detecting points representing that surface;

(c) rotating the workpiece; and (d) directing a cutter along a path parallel to the contour of said surface at a constant depth in said workpiece by autonomously controlling the position of the cutter based upon the points detected in the scanning step.

12. The method of claim 18 wherein step (a) includes eccentrically mounting the workpiece relative to the rotational axis of the workpiece holder.

13. A cutting system comprising:

a rotatable fixture;

a workpiece mounted on said fixture for rotation therewith;

a reflector coupled to one of said fixture and workpiece; and a cutting head having a cutting tip movably mounted thereto and positioned for moving toward and away from said workpiece, said cutting head being coupled to said fixture and further including a sensor oriented for receiving a signal reflected off said reflector upon each revolution of the workpiece.

14. The cutting system of claim 13 further including a light emitter associated with said cutting head for emitting light toward said reflector.

15. The cutting system of claim 13 wherein said cutting head includes a second light emitter for emitting light toward said workpiece and a second sensor oriented for receiving light reflected off said workpiece from said second emitter.

16. The cutting system of claim 13 further including means for reciprocating said cutting tip.

17. The cutting system of claim 13 further including a tool post coupled to said fixture, said cutting head including a mount coupled to said tool post and a carriage slidably coupled to said mount, said cutting tip being secured to said carriage.

18. The method of claim 3 wherein the controlling step includes reciprocating the cutter with a mechanism that is driven by a servomotor.

* * * * *